(12) United States Patent
He et al.

(10) Patent No.: US 11,032,830 B2
(45) Date of Patent: Jun. 8, 2021

(54) SCHEDULING REQUEST FOR WIRELESS SYSTEMS

(71) Applicant: QUALCOMM Incorporated, San Diego, CA (US)

(72) Inventors: Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/894,734

(22) Filed: Feb. 12, 2018

(65) Prior Publication Data

US 2018/0324832 A1 Nov. 8, 2018

Related U.S. Application Data

(60) Provisional application No. 62/502,478, filed on May 5, 2017.

(51) Int. Cl.
*H04W 72/12* (2009.01)
*H04W 72/14* (2009.01)
*H04W 72/10* (2009.01)

(52) U.S. Cl.
CPC ... *H04W 72/1242* (2013.01); *H04W 72/1284* (2013.01); *H04W 72/14* (2013.01); *H04W 72/10* (2013.01)

(58) Field of Classification Search
CPC ......... H04W 72/1284; H04W 72/1278; H04W 28/0278; H04L 5/0032; H04L 5/0053
See application file for complete search history.

(56) References Cited

U.S. PATENT DOCUMENTS

| | | | |
|---|---|---|---|
| 9,301,311 B2 * | 3/2016 | Jersenius | H04W 72/1278 |
| 2007/0121542 A1 | 5/2007 | Lohr et al. | |
| 2008/0225693 A1 | 9/2008 | Zhang et al. | |
| 2010/0202420 A1 * | 8/2010 | Jersenius | H04W 72/1278 |
| | | | 370/337 |

(Continued)

OTHER PUBLICATIONS

Idaho National Laboratory: "Frame Structure for Ultra-Low Latency Scheduled-Based UL Access," 3GPP Draft, R1-1608710, 3rd Generation Partnership Project (3GPP), Mobile Competence Centre, 650, Route Des Lucioles ; F-06921 Sophia-Antipolis Cedex, France, vol. RAN WG1, No. Lisbon, Portugal, Oct. 10, 2016-Oct. 14, 2016 Oct. 9, 2016 (Oct. 9, 2016), XP051148767, 5 Pages, Retrieved from the Internet: URL:http://www.3gpp.org/ftp/Meetings_3GPP_SYNC/ RAN1/Docs/ [retrieved on Oct. 9, 2016].

(Continued)

*Primary Examiner* — Shukri Taha
(74) *Attorney, Agent, or Firm* — Holland & Hart LLP

(57) ABSTRACT

Methods, systems, and devices for wireless communication are described that provide for a single bit or multiple bit scheduling request (SR). The SR may be transmitted by a user equipment (UE) to a base station and may indicate that the UE has data to be transmitted to the base station. The SR may include an indication of the priority level associated with the data to be transmitted to the base station, which may be based on the data type, logical channel, or numerology associated with the data to be transmitted to the base station.

25 Claims, 14 Drawing Sheets

(56) References Cited

U.S. PATENT DOCUMENTS

| | | | | |
|---|---|---|---|---|
| 2012/0281566 | A1* | 11/2012 | Pelletier | H04W 72/1221 370/252 |
| 2015/0117342 | A1* | 4/2015 | Loehr | H04W 72/1268 370/329 |
| 2015/0173099 | A1* | 6/2015 | Sun | H04W 72/10 370/336 |
| 2017/0245245 | A1* | 8/2017 | Kim | H04W 72/1284 |
| 2018/0084568 | A1* | 3/2018 | Wei | H04W 72/0413 |
| 2018/0279353 | A1* | 9/2018 | Shaheen | H04W 72/1289 |
| 2019/0059096 | A1* | 2/2019 | Wang | H04W 72/0413 |
| 2019/0124674 | A1* | 4/2019 | Lee | H04W 72/1268 |
| 2020/0296749 | A1* | 9/2020 | Freda | H04W 28/0268 |

OTHER PUBLICATIONS

Intel Corporation: "Enhancements of SR/BSR in NR," 3GPP Draft, R2-1703422, SR BSR, 3rd Generation Partnership Project (3GPP), Mobile Competence Centre, 650, Route Des Lucioles, F-06921 Sophia-Antipolis Cedex, France, vol. RAN WG2, No. Spokane, US, Mar. 3, 2017-Mar. 7, 2017 Apr. 3, 2017 (Apr. 3, 2017), XP051245278, 4 Pages, Retrieved from the Internet: URL:http://www.3gpp.org/ftp/Meetings_3GPP_SYNC/RAN2/Docs/ [retrieved on Apr. 3, 2017].

Intel Corporation: "On Low Latency Scheduling Request," 3GPP Draft, R1-1704756, INTEL-URLLC UL SR, 3rd Generation Partnership Project T3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017 Apr. 2, 2017 (Apr. 2, 2017), XP051242894, 4 Pages, Retrieved from the Internet: URL:http://www.3gpp.org/ftp/Meetings_3GPP_SYNC/RAN1/Docs/ [retrieved on Apr. 2, 2017].

International Search Report and Written Opinion—PCT/US2018/028434—ISA/EPO—dated Jul. 10, 2018.

Lenovo et al., "Enhanced SR for URLLC," 3GPP Draft, R2-1703030, Enhanced SR for NR URLLC, 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017 Apr. 3, 2017 (Apr. 3, 2017), XP051244985, 3 Pages, Retrieved from the Internet: URL:http://www.3gpp.org/ftp/Meetings_3GPP_SYNC/RAN2/Docs/ [retrieved on Apr. 3, 2017].

Qualcomm Incorporated: "Enhancements to SR in NR," 3GPP Draft, R2-1704900, Enhancements to SR in NR, 3rd Generation Partnership Project (3GPP), Mobile Competence Centre, 650, Route Des Lucioles, F-06921 Sophia-AntiPolis Cedex, France, vol. RAN WG2, No. Hangzhou, China, May 15, 2017-May 19, 2017 May 4, 2017 (May 4, 2017), XP051263640, pp. 1-4, Retrieved from the Internet: URL:http://www.3gpp.org/ftp/tsg_ran/WG2_RL2/TSGR2 98/Docs/ [retrieved on May 4, 2017].

* cited by examiner

SCHEDULING REQUEST FOR WIRELESS SYSTEMS

CROSS REFERENCES

The present Application for Patent claims priority to U.S. Provisional Patent Application No. 62/502,478 by He, et al., entitled "Scheduling Request For Wireless Systems," filed May 5, 2017, assigned to the assignee hereof.

BACKGROUND

The following relates generally to wireless communication, and more specifically to scheduling requests for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications system, a UE may transmit a scheduling request (SR) when the UE determines that it has data in a buffer to be transmitted to a base station. The SR may be transmitted on a control channel (e.g., a physical uplink control channel (PUCCH)) and may be of a binary signaling scheme (e.g., consisting of 1 bit of information) that indicates whether or not there is pending uplink data at the UE. When the SR is received by the base station, the base station may determine that the UE has data pending based on the SR. However, the base station may be unable to determine the amount of data, the type of data, or priority information related to the data. As such, the base station may be unable to schedule appropriate resources for the UE based on the SR, which may result in a degradation of the scheduling efforts by the base station as well as a reduction in system performance (e.g., if the base station schedules an inadequate channel or amount of resources for the UE).

SUMMARY

The described techniques relate to improved methods, systems, devices, or apparatuses that support scheduling requests (SRs) for wireless systems. Generally, the described techniques provide for a single bit or multi-bit SR that may be used to indicate a priority level associated with data that triggered the SR. For example, a user equipment (UE) may identify that it has data in a buffer to be transmitted to a base station. The data may be associated with a given priority level, numerology, or logical channel, which may be based on the data type or other factors. In some cases, a bit field within the SR may be used to indicate the priority level of the data to be transmitted. In other cases, an SR configuration (e.g., a format of the SR) or the radio resources used for transmission of the SR may indicate the priority level. In some example, the data to be transmitted to the base station may be associated with a target numerology. To indicate the numerology of the data to be transmitted, a UE may transmit an SR according to the same numerology or using radio resources configured according to the target numerology. Upon reception of the SR, the base station may determine a priority level for the data to be transmitted and schedule appropriate radio resources for the data. The scheduled resources may then be indicated to the UE in an uplink grant message.

A method of wireless communication is described. The method may include identifying, at a UE, that the UE has data in a buffer to be transmitted to a base station, determining a priority level for the data in the buffer to be transmitted to the base station based at least in part on a logical channel for the data, or a data type associated with the data, or a combination thereof, and transmitting, to the base station, a SR that indicates the priority level for the data.

An apparatus for wireless communication is described. The apparatus may include means for identifying, at a UE, that the UE has data in a buffer to be transmitted to a base station, means for determining a priority level for the data in the buffer to be transmitted to the base station based at least in part on a logical channel for the data, or a data type associated with the data, or a combination thereof, and means for transmitting, to the base station, a SR that indicates the priority level for the data.

Another apparatus for wireless communication is described. The apparatus may include a processor, memory in electronic communication with the processor, and instructions stored in the memory. The instructions may be operable to cause the processor to identify, at a UE, that the UE has data in a buffer to be transmitted to a base station, determine a priority level for the data in the buffer to be transmitted to the base station based at least in part on a logical channel for the data, or a data type associated with the data, or a combination thereof, and transmit, to the base station, a SR that indicates the priority level for the data.

A non-transitory computer-readable medium for wireless communication is described. The non-transitory computer-readable medium may include instructions operable to cause a processor to identify, at a UE, that the UE has data in a buffer to be transmitted to a base station, determine a priority level for the data in the buffer to be transmitted to the base station based at least in part on a logical channel for the data, or a data type associated with the data, or a combination thereof, and transmit, to the base station, a SR that indicates the priority level for the data.

In some examples of the method, apparatus, and non-transitory computer-readable medium described above, the SR includes an indication of the determined priority level using a bit field of the SR.

In some examples of the method, apparatus, and non-transitory computer-readable medium described above, the bit field of the SR comprises a plurality of bits to indicate the determined priority level.

Some examples of the method, apparatus, and non-transitory computer-readable medium described above may further include processes, features, means, or instructions for selecting, based at least in part on the determined priority level, a first set of radio resources of a plurality of sets of radio resources to be used to transmit the SR, wherein transmitting the SR comprises transmitting the SR using the identified first set of radio resources.

Some examples of the method, apparatus, and non-transitory computer-readable medium described above may further include processes, features, means, or instructions for receiving, from the base station, an uplink grant for transmission of the data in uplink message. Some examples of the method, apparatus, and non-transitory computer-readable medium described above may further include processes, features, means, or instructions for identifying uplink resources for the uplink message based at least in part on the uplink grant. Some examples of the method, apparatus, and non-transitory computer-readable medium described above may further include processes, features, means, or instructions for transmitting, using the identified uplink resources, the uplink message comprising the data.

In some examples of the method, apparatus, and non-transitory computer-readable medium described above, the uplink grant indicates resources that correspond to the logical channel for transmission of the data.

In some examples of the method, apparatus, and non-transitory computer-readable medium described above, the SR may be transmitted on a different set of resources than the identified uplink resources.

Some examples of the method, apparatus, and non-transitory computer-readable medium described above may further include processes, features, means, or instructions for selecting an SR configuration for transmission of the SR based at least in part on the determined priority level.

Some examples of the method, apparatus, and non-transitory computer-readable medium described above may further include processes, features, means, or instructions for identifying that the determined priority level exceeds a threshold, wherein the SR may be transmitted based at least in part on the identification that the determined priority level exceeds the threshold.

In some examples of the method, apparatus, and non-transitory computer-readable medium described above, one or both of the logical channel for the data and the determined priority level correspond to a numerology.

Some examples of the method, apparatus, and non-transitory computer-readable medium described above may further include processes, features, means, or instructions for transmitting, to the base station, a second SR based at least in part on an identification that the UE may have additional data to be transmitted to the base station, wherein the SR corresponds to a first time period that may be less than a second time period corresponding to the second SR.

Some examples of the method, apparatus, and non-transitory computer-readable medium described above may further include processes, features, means, or instructions for identifying, by the UE, that the UE may have additional data to be transmitted to the base station. Some examples of the method, apparatus, and non-transitory computer-readable medium described above may further include processes, features, means, or instructions for determining a second priority level for the additional data based at least in part on a logical channel for the additional data, or a data type associated with the additional data, or a combination thereof, wherein transmitting the SR may be based at least in part on the priority level being greater than the second priority level.

In some examples of the method, apparatus, and non-transitory computer-readable medium described above, the SR includes an indication of a buffer status for the data to be transmitted to the base station.

Some examples of the method, apparatus, and non-transitory computer-readable medium described above may further include processes, features, means, or instructions for receiving, from the base station, a mapping that indicates a correspondence between values for the SR and priority levels for multiple logical channels.

Some examples of the method, apparatus, and non-transitory computer-readable medium described above may further include processes, features, means, or instructions for identifying a target numerology for the data to be transmitted to the base station, wherein the SR indicates the target numerology.

Some examples of the method, apparatus, and non-transitory computer-readable medium described above may further include processes, features, means, or instructions for selecting an SR configuration for transmission of the SR based at least in part on the target numerology.

In some examples of the method, apparatus, and non-transitory computer-readable medium described above, the SR may be transmitted over a dedicated set of resources.

A method of wireless communication is described. The method may include receiving, by a base station, a SR that indicates a UE has data in a buffer to transmit to the base station, and a priority level for the data, determining the priority level of the data based at least in part on the SR, identifying resources for transmission of the data based at least in part on the priority level, and transmitting, to the UE, an uplink grant indicating the identified resources.

An apparatus for wireless communication is described. The apparatus may include means for receiving, by a base station, a SR that indicates a UE has data in a buffer to transmit to the base station, and a priority level for the data, means for determining the priority level of the data based at least in part on the SR, means for identifying resources for transmission of the data based at least in part on the priority level, and means for transmitting, to the UE, an uplink grant indicating the identified resources.

Another apparatus for wireless communication is described. The apparatus may include a processor, memory in electronic communication with the processor, and instructions stored in the memory. The instructions may be operable to cause the processor to receive, by a base station, a SR that indicates a UE has data in a buffer to transmit to the base station, and a priority level for the data, determine the priority level of the data based at least in part on the SR, identify resources for transmission of the data based at least in part on the priority level, and transmit, to the UE, an uplink grant indicating the identified resources.

A non-transitory computer-readable medium for wireless communication is described. The non-transitory computer-readable medium may include instructions operable to cause a processor to receive, by a base station, a SR that indicates a UE has data in a buffer to transmit to the base station, and a priority level for the data, determine the priority level of the data based at least in part on the SR, identify resources for transmission of the data based at least in part on the priority level, and transmit, to the UE, an uplink grant indicating the identified resources.

In some examples of the method, apparatus, and non-transitory computer-readable medium described above, the SR includes an indication of the determined priority level using a bit field of the SR.

In some examples of the method, apparatus, and non-transitory computer-readable medium described above, the bit field of the SR comprises a plurality of bits to indicate the determined priority level.

Some examples of the method, apparatus, and non-transitory computer-readable medium described above may further include processes, features, means, or instructions for identifying a first set of radio resources of a plurality of sets of radio resources used to receive the SR, wherein determining the priority level may be based at least in part on the identified first set of radio resources.

Some examples of the method, apparatus, and non-transitory computer-readable medium described above may further include processes, features, means, or instructions for receiving, from the UE and over the identified resources for transmission of the data, an uplink message that comprises the data based at least in part on the uplink grant.

In some examples of the method, apparatus, and non-transitory computer-readable medium described above, the SR may be received on a different set of radio resources than the uplink message.

In some examples of the method, apparatus, and non-transitory computer-readable medium described above, the uplink grant indicates resources that correspond to a logical channel to be used for transmission of the data.

In some examples of the method, apparatus, and non-transitory computer-readable medium described above, the priority level may be determined based at least in part on a numerology indicated by the SR.

In some examples of the method, apparatus, and non-transitory computer-readable medium described above, the SR may be received according to the numerology. In some examples of the method, apparatus, and non-transitory computer-readable medium described above, the identified resources may be identified based at least in part on the numerology.

Some examples of the method, apparatus, and non-transitory computer-readable medium described above may further include processes, features, means, or instructions for transmitting, to the UE, a mapping that indicates a correspondence between values for the SR and priority levels for multiple logical channels.

In some examples of the method, apparatus, and non-transitory computer-readable medium described above, the SR further includes an indication of a buffer status for the data to be transmitted to the base station.

In one embodiment, a device or system may include a processor, memory in electronic communication with the processor, instructions stored in the memory and operable, when executed by the processor, to cause the apparatus to: identify, at a UE, that the UE has data in a buffer to be transmitted to a base station, determine a priority level for the data in the buffer to be transmitted to the base station based at least in part on a logical channel for the data, or a data type associated with the data, or a combination thereof, and transmit, to the base station, a SR that indicates the priority level for the data.

In one embodiment, a device or system may include a processor, memory in electronic communication with the processor, instructions stored in the memory and operable, when executed by the processor, to cause the apparatus to: receive, by a base station, a SR that indicates a UE has data in a buffer to transmit to the base station, and a priority level for the data, determine the priority level of the data based at least in part on the SR, identify resources for transmission of the data based at least in part on the priority level, and transmit, to the UE, an uplink grant indicating the identified resources.

DETAILED DESCRIPTION

Figure 1:
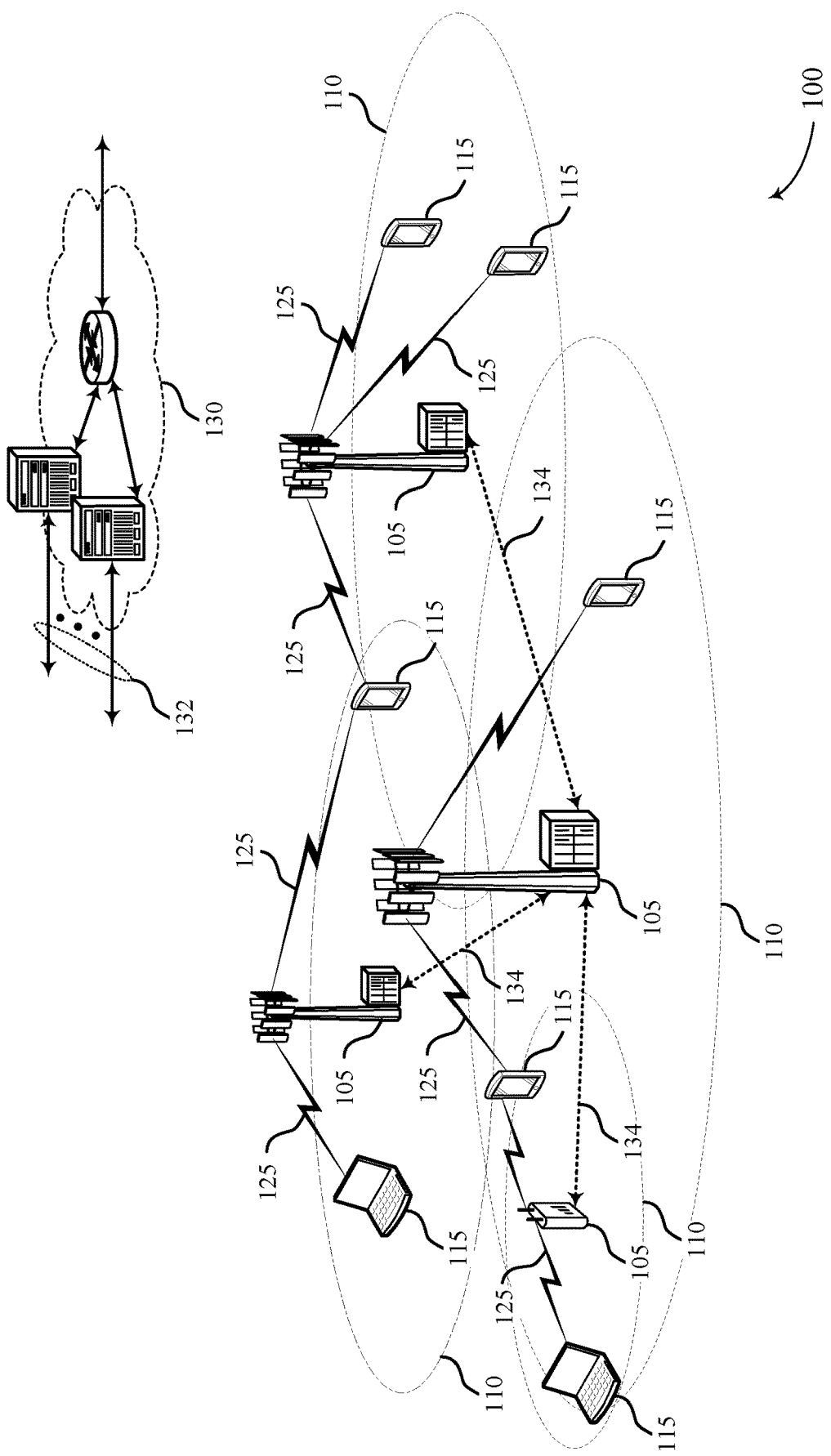
FIG. 1 illustrates an example of a system for wireless communication that supports scheduling requests for wireless systems in accordance with aspects of the present disclosure.

Wireless communications systems support data communications between a user equipment (UE) and a base station. The UE may store data in a buffer and indicate to the base station that it has data to be transmitted to the base station. In some cases, prior to transmission of data from a UE to a base station, the UE may transmit a scheduling request (SR) to the base station to request resources for transmitting the data. In some cases, the SR sent to the base station may merely indicate that the UE has data pending based on the SR. However, the base station may be unable to determine the amount of data, the type of data, or priority information related to the data based on the SR. As such, the base station may be unable to schedule appropriate resources for the UE based on the SR, for example by scheduling too many radio resources when only a small amount of data is to be transmitted, or by scheduling too few radio resources when a large amount of data is to be transmitted. Similarly, a base station, not being aware of the priority of the data for which the SR is sent, may schedule lower priority data before higher priority data, or otherwise misallocate resources, which may increase latency of high priority data. As a result, there may be a reduction in system performance.

An SR may be a single bit or a multi-bit message that may indicate a priority level associated with the data to be transmitted to the base station. In some cases, the SR may include an indication of a buffer status (e.g., a size of the data to be transmitted to the base station). The SR configuration (e.g., the format, the resources used to transmit the SR, and/or the numerology used to transmit the SR) may be based on the data to be transmitted. For example, an SR configuration or an SR itself may be selected from a set of SRs or SR configurations associated with different priority levels. In some instance, the priority level of the data to be transmitted to the base station may be determined by the UE based on a logical channel to be used for transmission of the data, a data type of the data, or a combination thereof. Upon receiving the SR, the base station may transmit an SR response message (e.g., to request more information relating to the data to be transmitted) or may determine resources for transmission of the data. The determined resources may then be indicated to the UE in an uplink grant message, for example.

In some circumstances, the network, including a serving base station, may be able to better allocate resources to the UE, and improve system performance, using the described SR, for example by reducing latency and increasing data throughput and reliability, with little or no increase in scheduling overhead. The SR described herein may also be compatible with service levels and numerologies, for example the SR may be used for low-latency services and high reliability services, as well as standard latency and reliability services.

Aspects of the disclosure are initially described in the context of a wireless communications system. Aspects are then describe with respect to scheduling request formats and a process flow. Aspects of the disclosure are further illustrated by and described with reference to apparatus diagrams, system diagrams, and flowcharts that relate to scheduling request for wireless systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beam formed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some examples, a UE 115 may transmit, to a base station 105, an indication of a priority level for data to be transmitted to the base station 105. The data may be temporarily stored in a buffer at the UE 115. The indication of the priority level may be transmitted in an SR, which may be a single bit or a multi-bit SR. In some cases, the radio resources or numerology used to transmit the SR may indicate a numerology or priority level of the data to be transmitted to the base station 105. In other cases, multiple SR configurations may be known by the UE 115 (e.g., predetermined or preconfigured) and the UE 115 may select a given SR configuration based on the data to be transmitted to the base station 105 (e.g., based on the data type and/or the logical channel for the data).

Figure 2:
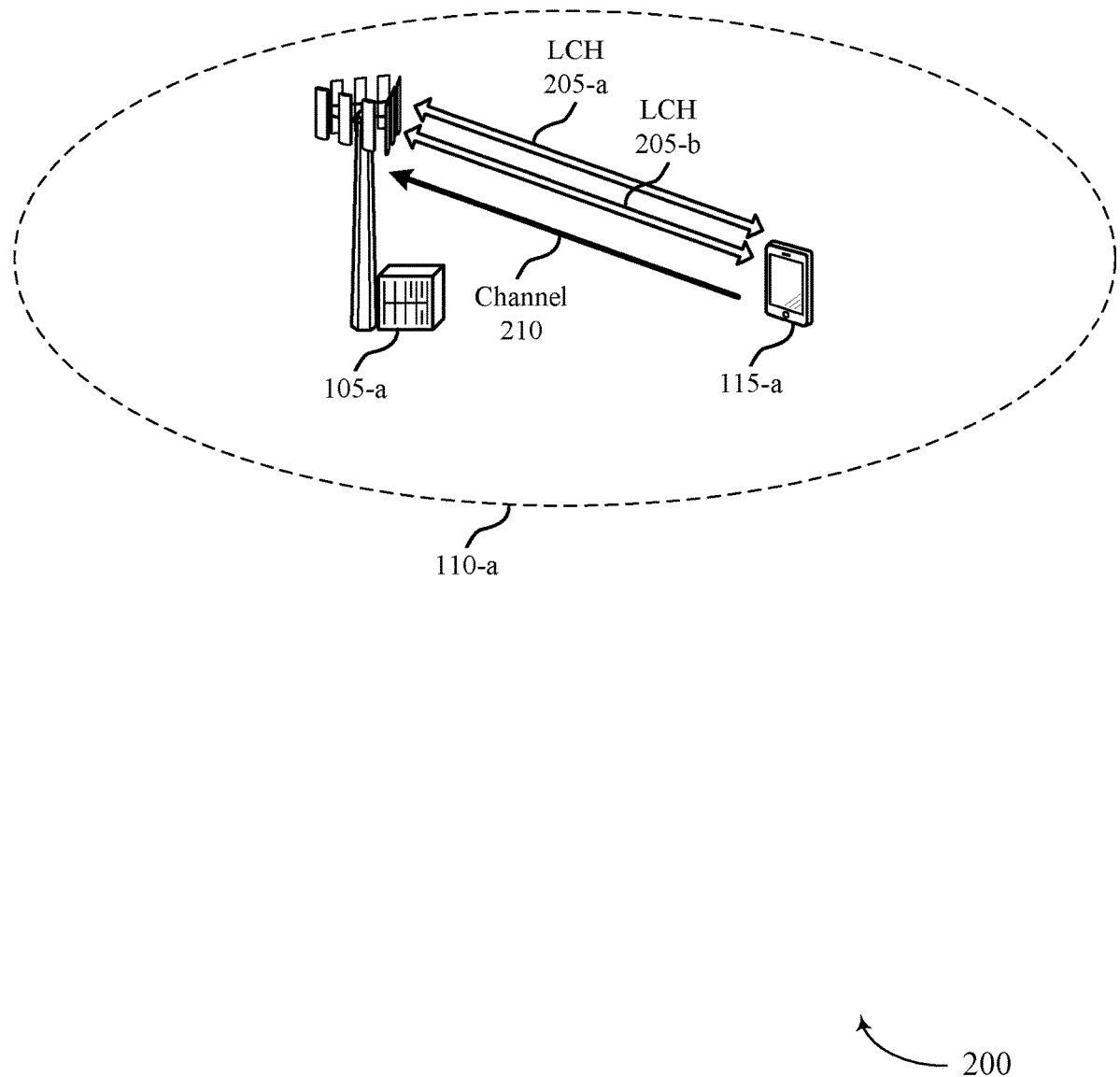
FIG. 2 illustrates an example of a wireless communications system that supports scheduling requests for wireless systems in accordance with aspects of the present disclosure.

FIG. 2 illustrates an example of a wireless communications system 200 that supports SRs for wireless systems in accordance with various aspects of the present disclosure. In some examples, wireless communications system 200 may implement aspects of wireless communications system 100. As shown, wireless communications system 200 includes a UE 115-a configured to communicate with a base station 105-a.

In some examples, UE 115-a and base station 105-a may exchange data over one or more logical channels (LCHs) 205. For instance, a UE 115-a may transmit data in an uplink message to the base station 105-a via LCH 205-a. LCHs 205-a and 205-b may be bidirectional channels, uplink channels, downlink channels, or a combination thereof. Different LCHs 205-a and 205-b may support different communication types such as TDMA, CDMA, FDMA, OFDMA, etc. The data exchanged using LCHs 205-a and 205-b may include voice data, video data, packet data, etc.

In wireless communications system 200, each of LCH 205-a and 205-b may operate according to a respective numerology. In some cases, one or more priority levels may be mapped to a particular numerology, and the numerology may be mapped to an LCH 205. The numerology may represent a particular subcarrier spacing of an LCH 205 in the frequency domain or a symbol or TTI duration in the time domain. The numerology of the channel may be scalable to provide a subcarrier spacing for the channel (e.g., to optimize channel performance). In some examples, the subcarrier spacing may range between 1 kHz and 480 kHz. The numerology of the channel along with the TTI duration of the channel, may be used to determine the radio resources available for a transmission on the channel. In some cases, the numerology of LCH 205-$a$ may be the same as the numerology of LCH 205-$b$, and in some cases, the numerology of LCH 205-$a$ may be different than the numerology of LCH 205-$b$. Further, according to some aspects, SR signaling may be used to distinguish the numerology and TTI duration of the logical channel that triggered the SR (e.g., LCH 205-$a$).

In some cases, data to be transmitted may have a particular priority, and may be mapped to a certain numerology based on the priority. For example, low latency communications (e.g., Ultra-Reliable Low Latency Communications (URLLC) data) may be designated for transmission using LCH 205-$a$ (e.g., due to the low latency nature of the communications). Thus, the pending URLLC data may have a high priority status for transmission. In this example, in order to meet the low latency requirements of the URLLC communications, LCH 205-$a$ may be assigned a numerology having a greater subcarrier spacing and smaller TTI duration such that the signal may be exchanged more quickly, and the URLLC communications mapped to LCH 205-$a$, while a numerology with lower subcarrier spacing may be used for LCH 205-$b$.

In another example, UE 115-$a$ may have non-URLLC data awaiting transmission, and may determine that the priority level for the pending transmission is of low priority (or at least lower than URLLC communications). As the latency standards may be less stringent as compared to low latency communications, LCH 205-$b$ may be used for transmission of the non-URLLC data that corresponds to a numerology having a smaller subcarrier spacing and longer TTI duration.

In some examples, prior to transmission of data, UE 115-$a$ may transmit an SR to base station 105-$a$ over channel 210 in order to indicate to the base station 105-$a$ that the UE 115-$a$ has data to be transmitted to the base station 105-$a$. In doing so, the UE 115-$a$ may expect to receive an uplink grant for data pending for LCH 205-$a$, LCH 205-$b$, or both. Channel 210 may be a control channel such as a physical uplink control channel (PUCCH) or another channel capable of transmitting an SR. In some cases, an SR signal transmitted on a PUCCH may use a binary signaling scheme indicating whether there is pending uplink data at the UE 115-$a$. In such instances, base station 105-$a$ may determine that UE 115-$a$ has data waiting, but may be unable to appropriately schedule radio resources to the UE 115-$a$ as the base station 105-$a$ does not know the priority for the pending data or how much data there is to be transmitted. This issue may be further complicated if UE 115-$a$ is configured with multiple numerologies as the base station 105-$a$ may not have enough information to determine which numerology it should provide for uplink grants to the UE 115-$a$.

Accordingly, an SR may be enhanced to include an indication of channel numerology, an indication of a buffer status, or may be configured for URLLC services. The SR may indicate the priority level of the data to be transmitted, and thus the numerology of the LCH (e.g., LCH 205-$a$) that triggered the request. The base station 105-$a$ may utilize the indication of the priority level to prioritize or schedule appropriate radio resources for the data to be transmitted. In some examples, such an indication may apply to all numerologies for an LCH 205.

To achieve ultra-reliability and low latency, an SR may be configured to have a comparable level of reliability and latency performance as the data to be transmitted (e.g., URLLC data), which may not be achievable using a single bit SR. For example, in some cases, the minimum configurable period of a TTI (e.g., a subframe) may be 1ms, which may be greater than the amount of time indicated by URLLC data standards. As such, the SR for URLLC may be of a specific format designed for URLLC, and may be designated for URLLC only (e.g., if the UE 115-$a$ is configured to communicate using URLLC and other numerologies). Depending on the design, the SR for URLLC may have multiple bits or one bit, and if multi-bit is supported, one or more of the bits may be used to indicate the buffer status of data to be transmitted using a URLLC service (e.g., instead of or in addition to indicating numerology or priority level).

In some cases, the SR for URLLC services may be transmitted using a specific PUCCH format, which may have compatible performance in reliability and low latency as URLLC data. If multiple bits are be supported for the SR, one or more of the multiple bits may be used to indicate the buffer status of the URLLC service. For numerologies other than URLLC, such techniques may provide service differentiation may also lead to a reduction in scheduling latency.

In some examples, an SR may distinguish the numerology of an LCH 205 (e.g., LCH 205-$a$) that triggered the request. Because an LCH 205 may be mapped to multiple numerologies, multiple options may be utilized as to how UE 115-$a$ may indicate which numerology to use for the LCH 205. For example, one option may be that the UE 115-$a$ determines the numerology to use for transmission. In another example, the base station 105-$a$ providing the uplink grant may determine the numerology to use.

An SR may also indicate a buffer status associated with the LCH 205 that triggered the request, so that base station 105-$a$ may allocate an appropriate amount of radio resources for the UE 115-$a$. The buffer status indicator may indicate how much data is awaiting transmission from the UE 115-$a$. Once the UE 115-$a$ receives a grant from the base station 105-$a$, the UE 115-$a$ may transmit data directly to the base station 105-$a$ (e.g., with reduced delay), which may be beneficial for high priority LCHs 205, but may have marginal benefits for LCHs that are less delay sensitive (e.g., data radio bearers (DRBs) using enhanced mobile broadband (eMBB) service).

Alternatively, after receiving an SR, the base station 105-$a$ may over-allocate radio resources in its first grant to the UE 115-$a$, so that the UE 115-$a$ may transmit its data directly after receiving the grant. As high-priority LCHs 205 tend to have small amount of data to send, this over-allocation may not result in increased overhead.

In one example, the UE 115-$a$ may decide which numerology to use for transmission of the data. In this example, when an SR is triggered by new data to be transmitted in an LCH 205, the UE 115-$a$ may select one of the numerologies to which that LCH 205 is mapped. The UE 115-$a$ may then transmit the SR associated with the selected numerology. The base station 105-$a$, after receiving the SR, may allocate one or more uplink grants according to the numerology indicated by the SR.

Allowing the UE 115-$a$ to decide which numerology to use may provide the UE 115-$a$ with flexibility in selecting which numerology to transmit data. However, allowing the UE 115-$a$ to decide may not give the base station 105-$a$ an accurate indication of the priority level of the new data, which may be important for the scheduler at the base station 105-a. For instance, because LCHs 205 with a wide range of priority levels may be mapped to the same numerology, an indication of the numerology may not be enough for the base station 105-a to decide which priority to use to schedule the UE 115-a. Additionally, when the UE 115-a is configured to communicate using a single numerology, indicating the numerology may be equivalent to using a single bit SR, and therefore may not provide the same scheduling benefit as using more than one numerology.

In another example, the base station 105-a may decide which numerology to use for transmission of the data. In this example, when an SR is triggered by new data in an LCH 205, the UE 115-a may indicate the priority level of that LCH 205, or some condensed version of that priority (e.g., an index to logical channel groups), by transmitting an SR associated with that priority level. After receiving the SR, base station 105-a may decide how to schedule the UE 115-a, including which numerology to use based on the priority level indicated in the SR. In this example, as the SR indicates a priority level, base station 105-a may map that priority to its configured numerologies and subsequently select which numerology to use based on the radio resources available. The base station 105-a then may decide how to prioritize the UE 115-a in that numerology. In such cases, indicating priority level of the triggering LCH 205 in an SR may facilitate the scheduling at the base station 105-a.

In some examples, an SR may use multiple configurations of single bit SRs. For example, a UE 115-b may be configured with multiple 1-bit SR resources and each of the SR resources may be associated with a priority level or a group of priorities. However, to indicate priority levels more precisely, the UE 115-b may be configured with several SR resources. Although different SR resources may be configured with different periods, this may impact the capacity of PUCCH.

An SR may also be a multi-bit SR, configured for a UE 115-a, where its bit values may be mapped to a group of priority levels. For example, if the multi-bit SR supports two bits, then the network may classify priorities of the LCHs 205 into four groups. The mapping between the values of a multi-bit SR and priorities of LCHs 205 may be configured by the network or by base station 105-a. In such instances, a multi-bit SR may utilize fewer PUCCH resources and although a multi-bit SR may be less reliable (e.g., due to the increased decoding complexity as a result of the number of bits) than a 1-bit SR, this degradation may be minimal and thus may not have a considerable impact on numerologies other than URLLC. Additionally, the period of the multi-bit SR may be configured similarly to a 1-bit SR such that devices capable of utilizing single bit SR may be capable of utilizing the multi-bit SR with less difficulty.

In some examples, a multi-bit SR may be configured for a UE 115-a to indicate the priority level of the LCH 205 that triggered the request. Additionally or alternatively, the network or base station 105-a may configure the mapping between the values of a multi-bit SR and priority levels of LCHs 205.

According to some aspects, multiple SRs may be configured for a UE 115-b. For example, if a 2-bit SR is supported, the network or base station 105-a may also configure two SRs for a UE 115-a. One multi-bit SR may be configured for high priority LCHs 205. The other SR, which may be either a multi-bit SR or a 1-bit SR, may be configured for low priority LCHs 205. These two SRs may have different periods. The SR associated with high priority LCHs 205 may be configured with a shorter period to reduce scheduling latency, which may be more beneficial for high priority LCHs 205.

In the above example of multiple SRs, if one or more numerologies is configured with its own PUCCH, the network may configure one SR, which may be either a multi-bit or a 1-bit SR, for each numerology. If a multi-bit SR is configured for a numerology, then the SR bit values may be mapped to the priorities of those LCHs 205 associated with that numerology. The period of these SRs may be configured based on the latency requirement of the LCHs 205 associated with those numerologies.

Additionally or alternatively, the network may have the option to configure multiple SRs for a UE 115-a, which may each be either a multi-bit SR or a 1-bit SR.

Figure 3A:
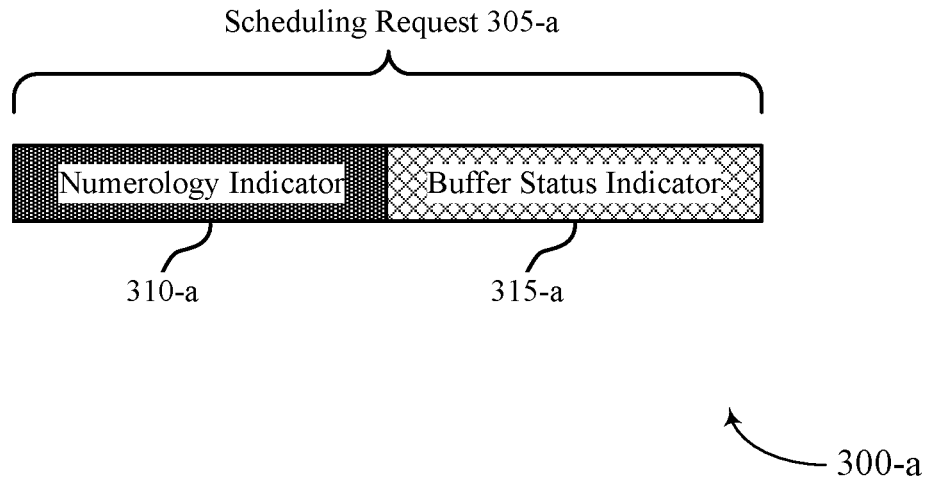
FIGS. 3A and 3B illustrate example scheduling request formats that support scheduling requests for wireless systems in accordance with aspects of the present disclosure.
Figure 3B:
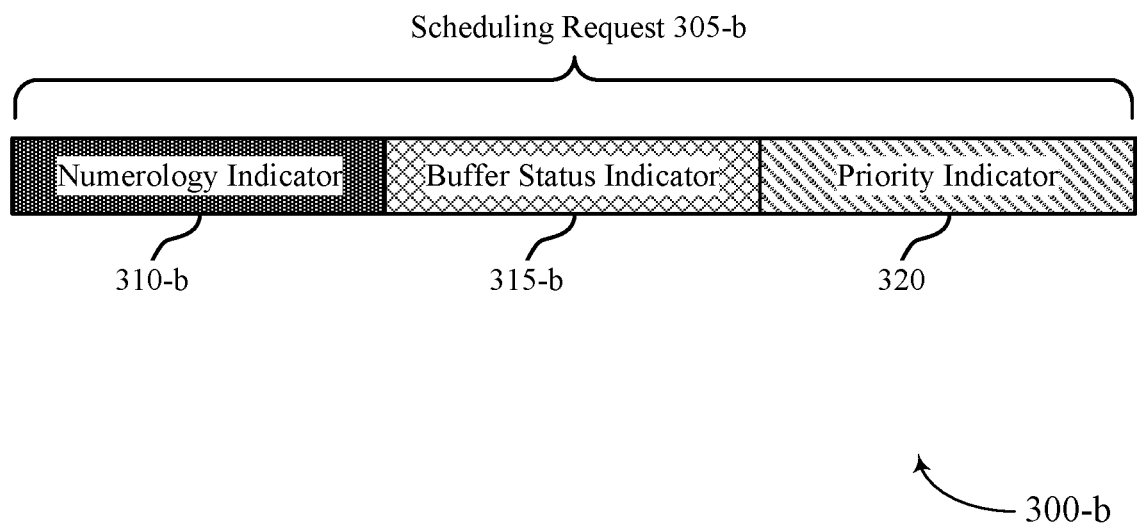

FIGS. 3A and 3B illustrate example SR formats 300 that support SRs for wireless systems in accordance with various aspects of the present disclosure. In some examples, SR formats 300 may implement aspects of wireless communications system 100.

SR 305-a may include a numerology indicator 310-a. The numerology indicator 310-a may indicate which numerology to use for data transmissions over the channel which triggered the SR 305-a (e.g., LCH 205-a). The base station, after receiving the SR 305-a, may allocate one or more uplink grants according to the numerology indicated by the numerology indicator 310-a. The numerology indicator may be a single bit or multiple bits, which may depend on the bit size of the SR 305-a.

SR 305-a may also include a buffer status indicator 315-a. Buffer status indicator 315-a may be associated with the LCH that triggered the request (e.g., LCH 205-a), so that a base station may allocate an appropriate amount of radio resources immediately for the UE. Buffer status indicator 315-a may indicate how much data is awaiting transmission from the UE. This may enable the base station receiving the SR 305-a to allocate an appropriate amount of radio resources in the associated uplink grant for UE data transmissions. Buffer status indicator may also be a single or multiple bits.

As shown in FIG. 3B, SR 305-b may include a numerology indicator 310-b. The numerology indicator 310-b may indicate in SR 305-b that data is pending in the LCH that triggered the SR (e.g., LCH 205-a). Numerology indicator 310-b may be a single bit or multiple bits.

SR 305-b may also include a buffer status indicator 315-b. Buffer status indicator 315-b may be associated with the LCH that triggered the request (e.g., LCH 205-a), so that the base station may allocate an appropriate amount of radio resources for the UE. Buffer status indicator 315-b may indicate how much data is awaiting transmission from the UE. This may enable the base station receiving the SR 305-b to allocate an appropriate amount of radio resources in the associated uplink grant for UE data transmissions. Buffer status indicator 315-b may also be a single or multiple bits.

In some examples, SR 305-b may also include priority indicator 320. The priority indicator 320 may indicate the priority level of the data awaiting transmission over the LCH that triggered SR 305-b (e.g., LCH 205-a). The priority level of the pending data may be associated with the type of data awaiting transmission (e.g., data or voice packets) or a transmission quality characteristic of the data (e.g., low latency data). The priority indicator 320 may be single bits or multiple bits. If the priority indicator 320 is multiple bits, each of its bit values may be mapped to a group of priority levels. After receiving the SR 305-b, a base station may decide how to schedule the UE, including which numerology to use based on the priority level indicated in the priority indicator 320.

Figure 4:
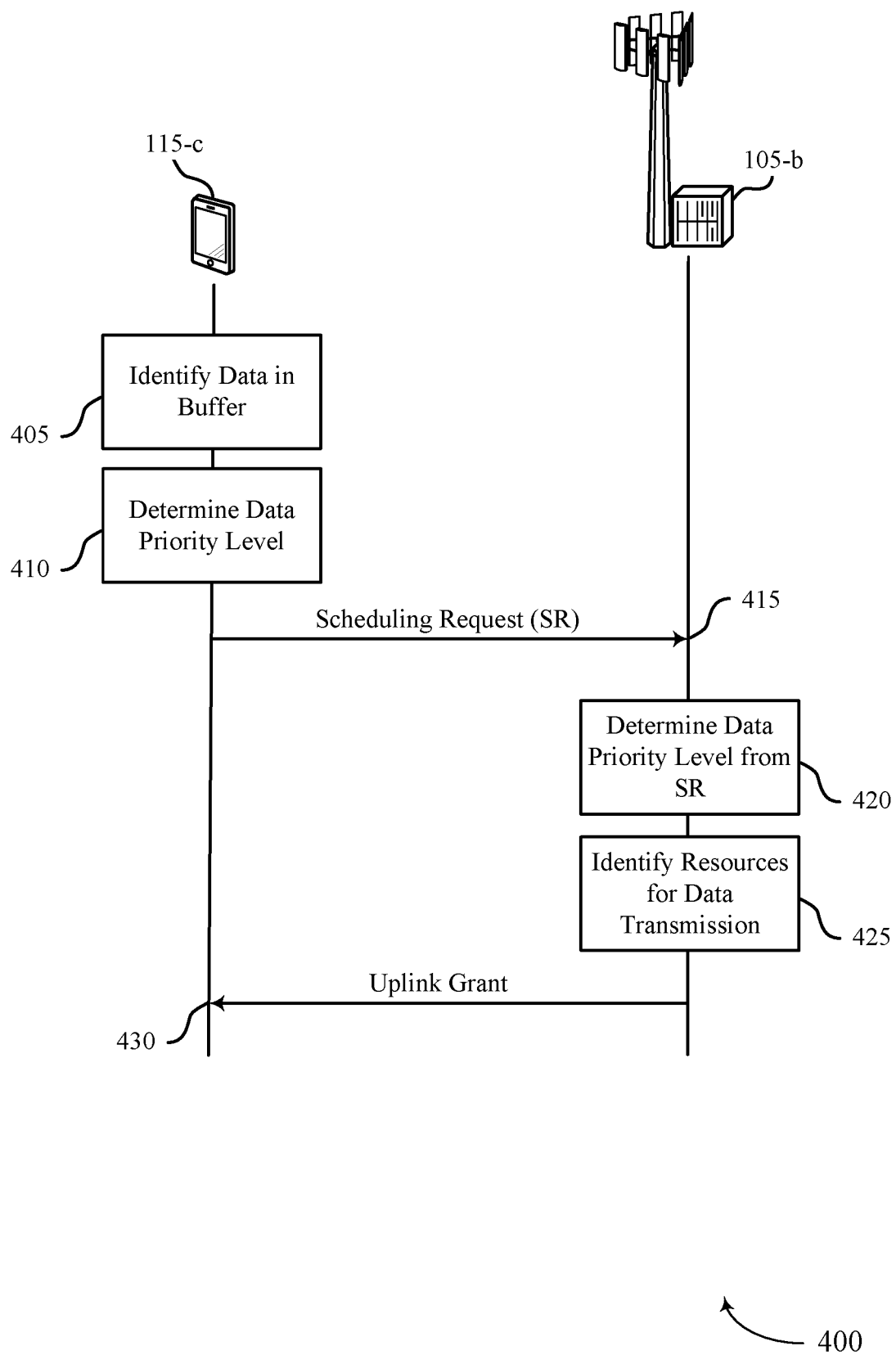
FIG. 4 illustrates an example of a process flow that supports scheduling requests for wireless systems in accordance with aspects of the present disclosure.

FIG. 4 illustrates an example of a process flow 400 that supports SRs for wireless systems in accordance with various aspects of the present disclosure. In some examples, process flow 400 may implement aspects of wireless communications system 100.

At 405, UE 115-*b* may identify that the UE 115-*b* has data in a buffer to be transmitted to base station 105-*b*. The buffer may be associated with a LCH, where the logical channel may correspond to a numerology, as described above with reference to FIG. 2.

At 410, UE 115-*b* may determine a priority level for the data in the buffer to be transmitted to the base station 105-*b*. This determination may be based on the LCH for the data, a data type associated with the data, or a combination thereof.

At 415, UE 115-*b* may transmit an SR to the base station 105-*b* that indicates the priority level for the data. The SR may be transmitted over a PUCCH, or any other channel capable of transmitting SRs. In some cases, the SR may also indicate the priority level for the data using a bit field, where the bit field comprises a single bit or multiple bits.

At 420, the base station 105-*b* may determine the priority of the data based on the received SR. In some cases, the priority level may be determined based on a numerology indicated by the SR.

At 425, the base station 105-*b* may identify radio resources for transmission of the buffered data based at least in part on the determined priority level. In some cases, the radio resources are identified based at least in part on a numerology indicated in the SR.

At 430, the base station 105-*b* may transmit an uplink grant indicating the identified radio resources to the UE 115-*b*. The uplink grant may be used by the UE 115-*b* to schedule transmissions for the buffered data. In some cases, the uplink grant may indicate radio resources that correspond to a LCH to be used for transmission of the buffered data.

Figure 5:
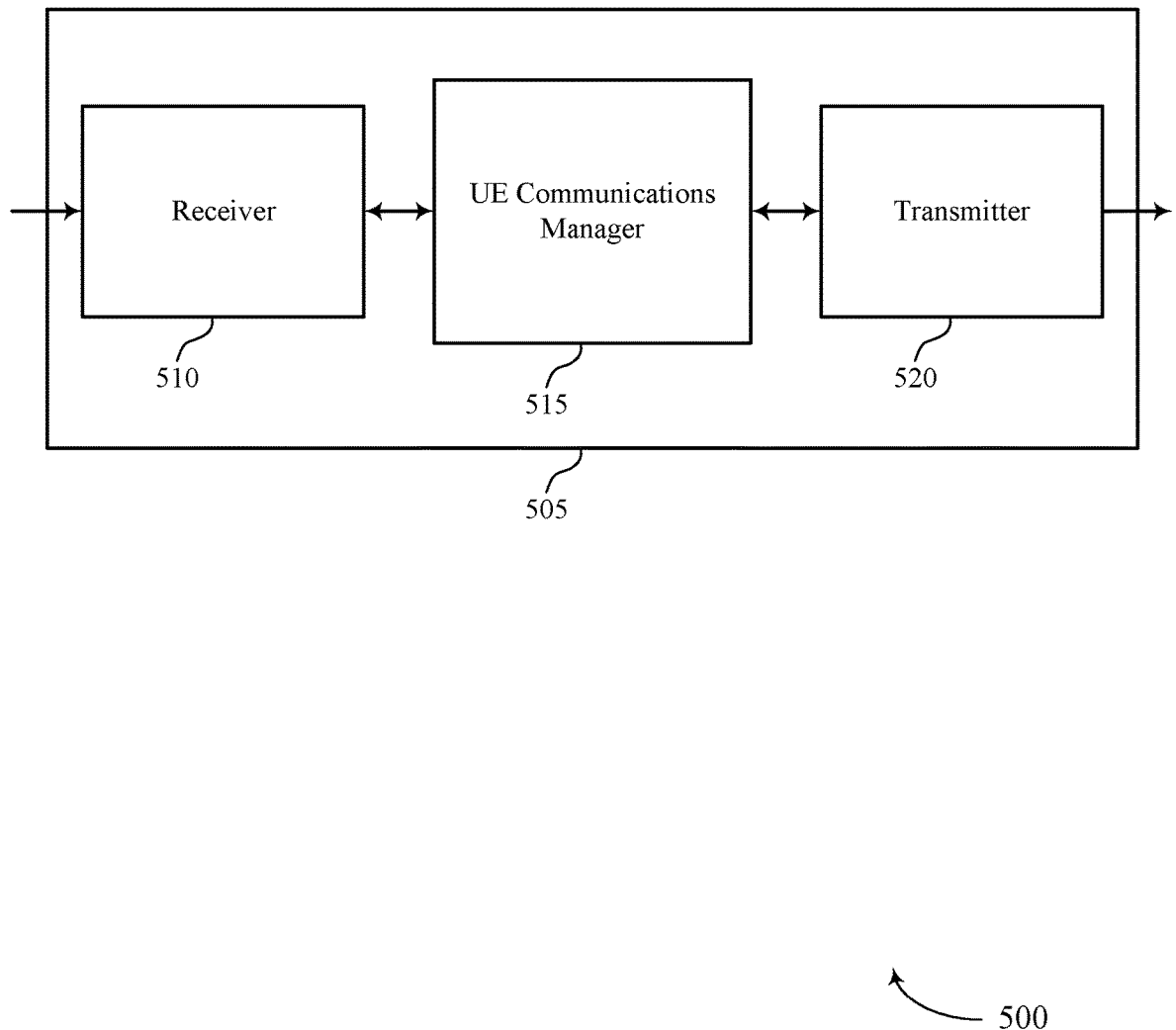
FIGS. 5 through 7 show block diagrams of a device that supports scheduling requests for wireless systems in accordance with aspects of the present disclosure.

FIG. 5 shows a block diagram 500 of a wireless device 505 that supports SR for wireless systems in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to scheduling request for wireless systems, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify, at a UE, that the UE has data in a buffer to be transmitted to a base station, determine a priority level for the data in the buffer to be transmitted to the base station based on a logical channel for the data, or a data type associated with the data, or a combination thereof, and transmit, to the base station, an SR that indicates the priority level for the data.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
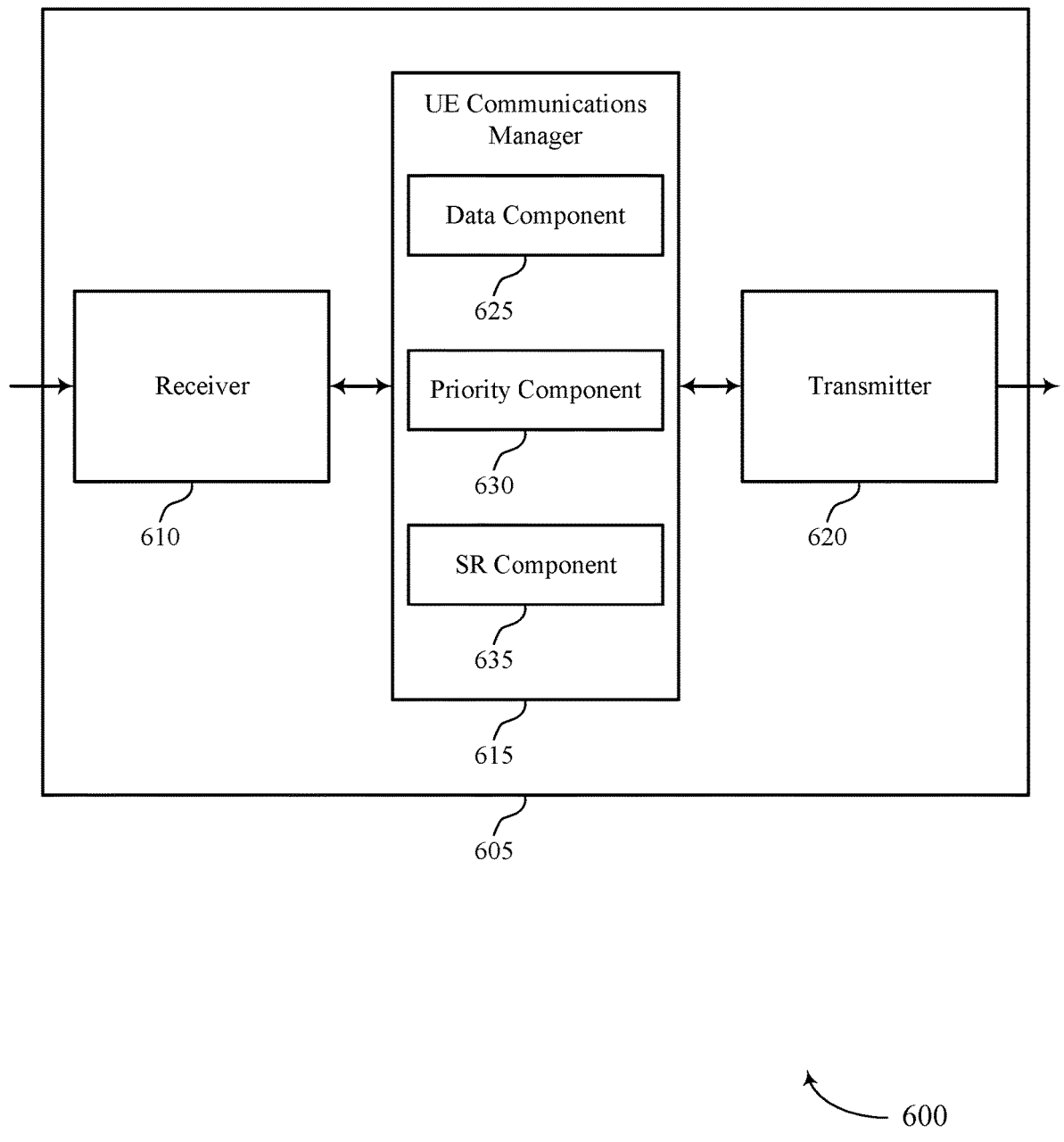

FIG. 6 shows a block diagram 600 of a wireless device 605 that supports scheduling requests for wireless systems in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to scheduling request for wireless systems, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8.

UE communications manager 615 may also include data component 625, priority component 630, and SR component 635.

Data component 625 may identify, at a UE, that the UE has data in a buffer to be transmitted to a base station and identify, by the UE, that the UE has additional data to be transmitted to the base station. In some cases, the data includes URLLC data.

Priority component 630 may determine a priority level for the data in the buffer to be transmitted to the base station based on a logical channel for the data, or a data type associated with the data, or a combination thereof and determine a second priority level for the additional data based on a logical channel for the additional data, or a data type associated with the additional data, or a combination thereof, where transmitting the SR is based on the priority level being greater than the second priority level. In some cases, one or both of the logical channel for the data and the determined priority level correspond to a numerology.

SR component 635 may transmit, to the base station, a SR that indicates the priority level for the data and transmit, to the base station, a second SR based on an identification that the UE has additional data to be transmitted to the base station. In some cases, the SR includes an indication of the determined priority level using a bit field of the SR. In some cases, the bit field of the SR includes a set of bits to indicate the determined priority level. In some cases, the SR is transmitted on a different set of radio resources than the identified uplink radio resources. In some cases, the SR corresponds to a first time period that is less than a second time period corresponding to the second SR. In some cases, the SR includes an indication of a buffer status for the data to be transmitted to the base station. In some cases, the SR is transmitted over a CDMA channel.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
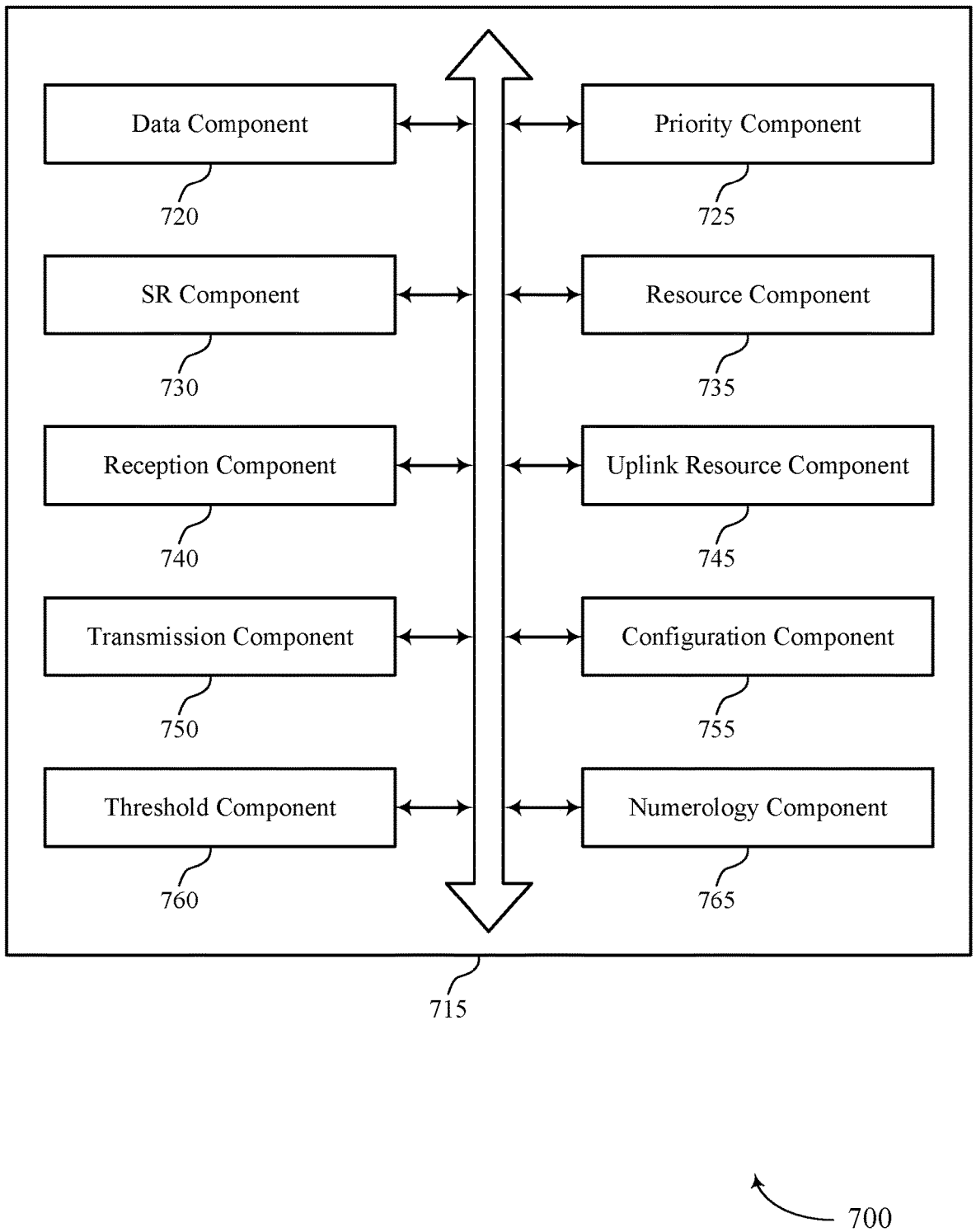

FIG. 7 shows a block diagram 700 of a UE communications manager 715 that supports scheduling requests for wireless systems in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include data component 720, priority component 725, SR component 730, resource component 735, reception component 740, uplink resource component 745, transmission component 750, configuration component 755, threshold component 760, and numerology component 765. Each of these modules may communicate, directly or indirectly, with one another (e.g., via one or more buses).

Data component 720 may identify, at a UE, that the UE has data in a buffer to be transmitted to a base station and identify, by the UE, that the UE has additional data to be transmitted to the base station. In some cases, the data includes URLLC data.

Priority component 725 may determine a priority level for the data in the buffer to be transmitted to the base station based on a logical channel for the data, or a data type associated with the data, or a combination thereof and determine a second priority level for the additional data based on a logical channel for the additional data, or a data type associated with the additional data, or a combination thereof, where transmitting the SR is based on the priority level being greater than the second priority level. In some cases, one or both of the logical channel for the data and the determined priority level correspond to a numerology.

SR component 730 may transmit, to the base station, a SR that indicates the priority level for the data and transmit, to the base station, a second SR based on an identification that the UE has additional data to be transmitted to the base station. In some cases, the SR includes an indication of the determined priority level using a bit field of the SR. In some cases, the bit field of the SR includes a set of bits to indicate the determined priority level. In some cases, the SR is transmitted on a different set of radio resources than the identified uplink resources. In some cases, the SR corresponds to a first time period that is less than a second time period corresponding to the second SR. In some cases, the SR includes an indication of a buffer status for the data to be transmitted to the base station. In some cases, the SR is transmitted over a PUCCH.

Resource component 735 may select, based on the determined priority level, a first set of radio resources of multiple sets of radio resources to be used to transmit the SR, where transmitting the SR includes transmitting the SR using the identified first set of radio resources.

Reception component 740 may receive, from the base station, an uplink grant for transmission of the data in uplink message and receive, from the base station, a mapping that indicates a correspondence between values for the SR and priority levels for multiple logical channels.

Uplink resource component 745 may identify uplink resources for the uplink message based on the uplink grant. In some cases, the uplink grant indicates resources that correspond to the logical channel for transmission of the data.

Transmission component 750 may transmit, using the identified uplink resources, the uplink message including the data.

Configuration component 755 may select an SR configuration for transmission of the SR based on the selected priority level and select an SR configuration for transmission of the SR based on the target numerology.

Threshold component 760 may identify that the determined priority level exceeds a threshold, where the SR is transmitted based on the identification that the determined priority level exceeds the threshold.

Numerology component 765 may identify a target numerology for the data to be transmitted to the base station, where the SR indicates the target numerology.

Figure 8:
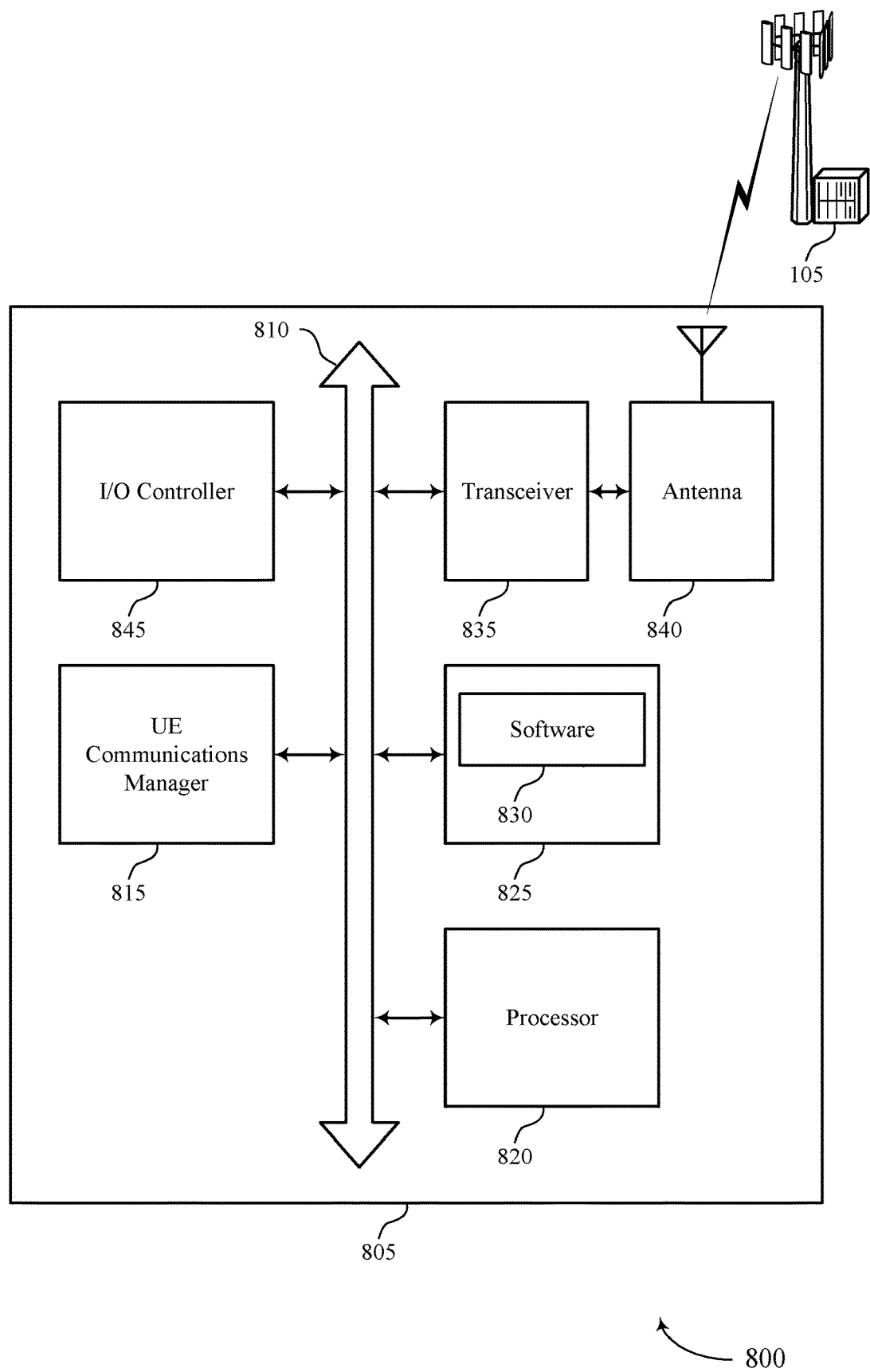
FIG. 8 illustrates a block diagram of a system including a UE that supports scheduling requests for wireless systems in accordance with aspects of the present disclosure.

FIG. 8 shows a diagram of a system 800 including a device 805 that supports scheduling requests for wireless systems in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting scheduling request for wireless systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support scheduling requests for wireless systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
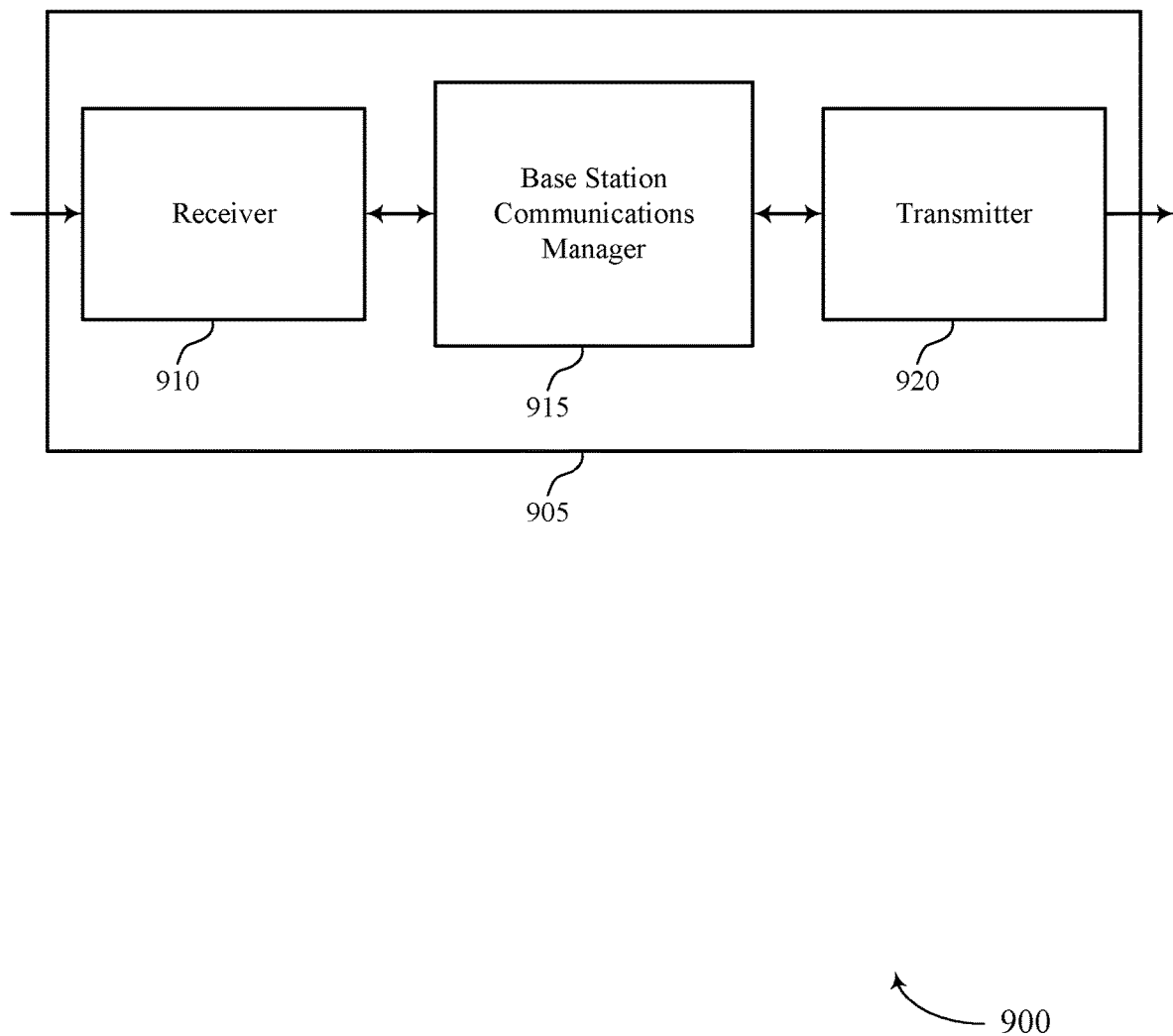
FIGS. 9 through 11 show block diagrams of a device that supports scheduling requests for wireless systems in accordance with aspects of the present disclosure.

FIG. 9 shows a block diagram 900 of a wireless device 905 that supports scheduling requests for wireless systems in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to scheduling request for wireless systems, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may receive, by a base station, a SR that indicates a UE has data in a buffer to transmit to the base station, and a priority level for the data, determine the priority level of the data based on the SR, identify resources for transmission of the data based on the priority level, and transmit, to the UE, an uplink grant indicating the identified resources.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
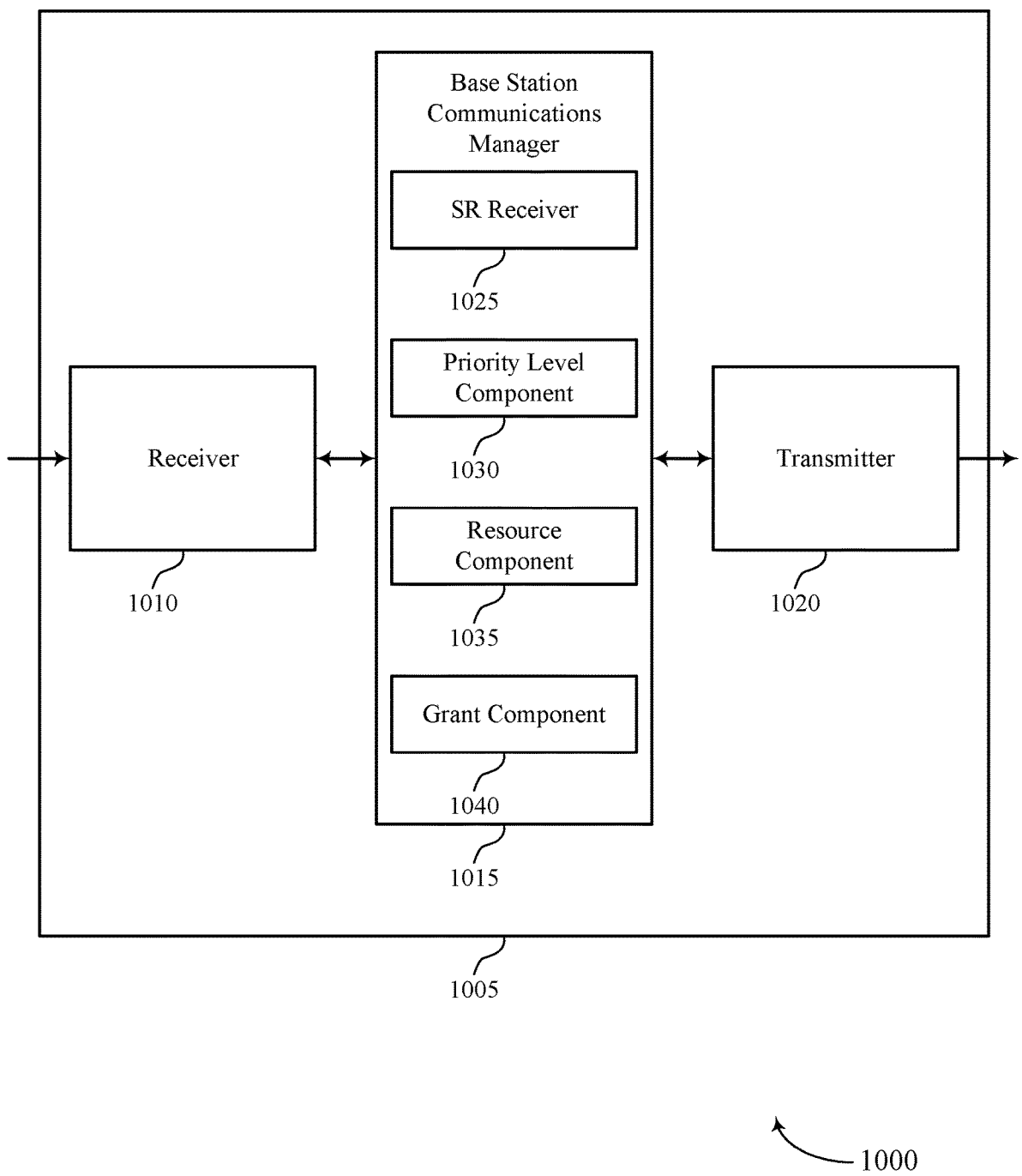

FIG. 10 shows a block diagram 1000 of a wireless device 1005 that supports scheduling requests for wireless systems in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to scheduling request for wireless systems, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include SR receiver 1025, priority level component 1030, resource component 1035, and grant component 1040.

SR receiver 1025 may receive, by a base station, an SR that indicates a UE has data in a buffer to transmit to the base station, and a priority level for the data. In some cases, the SR includes an indication of the determined priority level using a bit field of the SR. In some cases, the bit field of the SR includes a set of bits to indicate the determined priority level. In some cases, the SR is received according to the numerology. In some cases, the SR further includes an indication of a buffer status for the data to be transmitted to the base station. In some cases, the data includes URLLC data. In some cases, the SR is transmitted over a PUCCH.

Priority level component 1030 may determine the priority level of the data based on the SR. In some cases, the priority level is determined based on a numerology indicated by the SR.

Resource component 1035 may identify resources for transmission of the data based on the priority level and identify a first set of radio resources of multiple sets of radio resources used to receive the SR, where determining the priority level is based on the identified first set of radio resources. In some cases, the identified resources are identified based on the numerology.

Grant component 1040 may transmit, to the UE, an uplink grant indicating the identified resources. In some cases, the uplink grant indicates resources that correspond to a logical channel to be used for transmission of the data.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
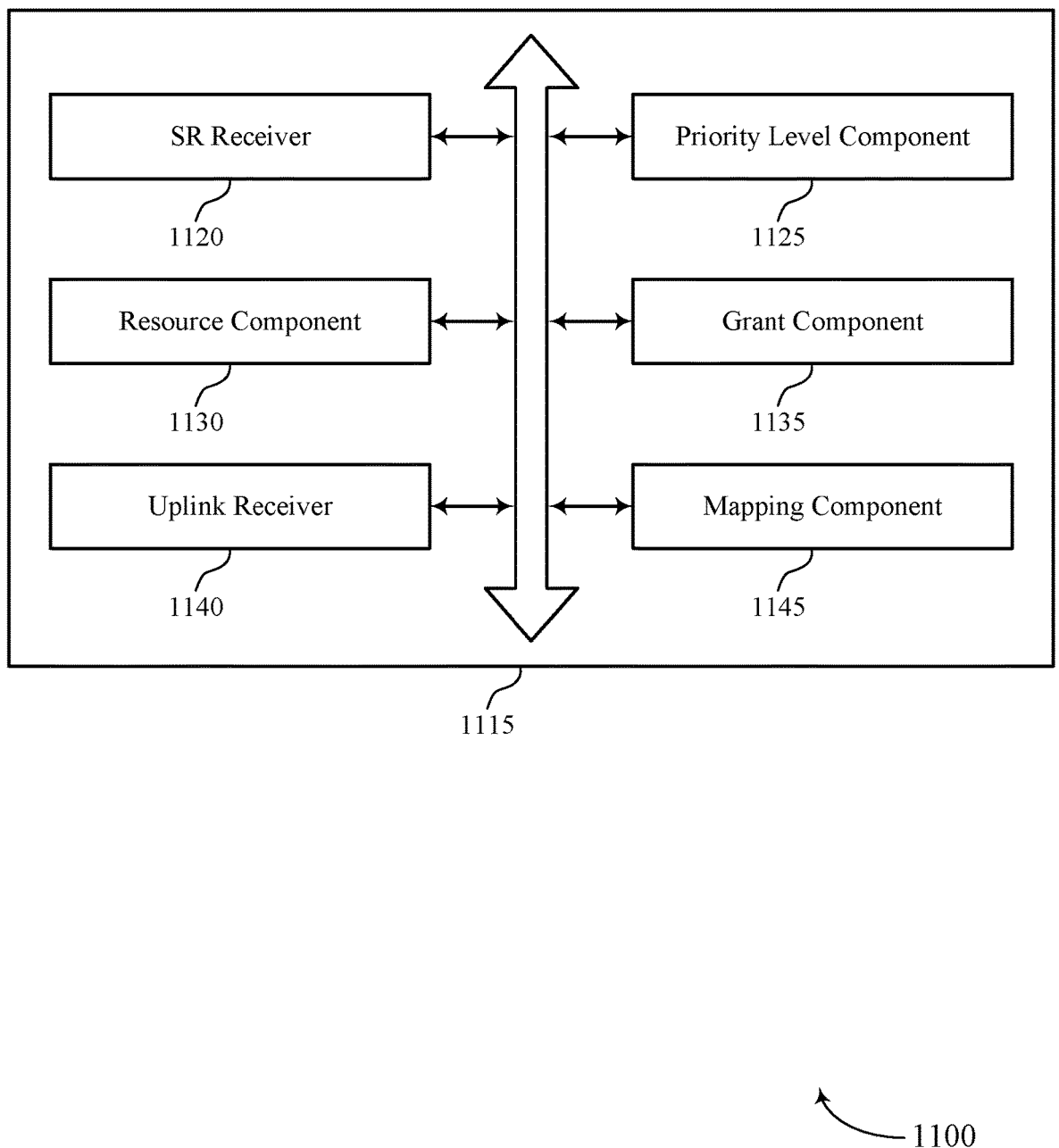

FIG. 11 shows a block diagram 1100 of a base station communications manager 1115 that supports scheduling requests for wireless systems in accordance with aspects of the present disclosure. The base station communications manager 1115 may be an example of aspects of a base station communications manager 1215 described with reference to FIGS. 9, 10, and 12. The base station communications manager 1115 may include SR receiver 1120, priority level component 1125, resource component 1130, grant component 1135, uplink receiver 1140, and mapping component 1145. Each of these modules may communicate, directly or indirectly, with one another (e.g., via one or more buses).

SR receiver 1120 may receive, by a base station, an SR that indicates a UE has data in a buffer to transmit to the base station, and a priority level for the data. In some cases, the SR includes an indication of the determined priority level using a bit field of the SR. In some cases, the bit field of the SR includes a set of bits to indicate the determined priority level. In some cases, the SR is received according to the numerology. In some cases, the SR further includes an indication of a buffer status for the data to be transmitted to the base station. In some cases, the data includes URLLC data. In some cases, the SR is transmitted over a PUCCH.

Priority level component 1125 may determine the priority level of the data based on the SR. In some cases, the priority level is determined based on a numerology indicated by the SR.

Resource component 1130 may identify resources for transmission of the data based on the priority level and identify a first set of radio resources of multiple sets of radio resources used to receive the SR, where determining the priority level is based on the identified first set of radio resources. In some cases, the identified resources are identified based on the numerology.

Grant component 1135 may transmit, to the UE, an uplink grant indicating the identified resources. In some cases, the uplink grant indicates resources that correspond to a logical channel to be used for transmission of the data.

Uplink receiver 1140 may receive, from the UE and over the identified resources for transmission of the data, an uplink message that includes the data based on the uplink grant. In some cases, the SR is received on a different set of radio resources than the uplink message.

Mapping component 1145 may transmit, to the UE, a mapping that indicates a correspondence between values for the SR and priority levels for multiple logical channels.

Figure 12:
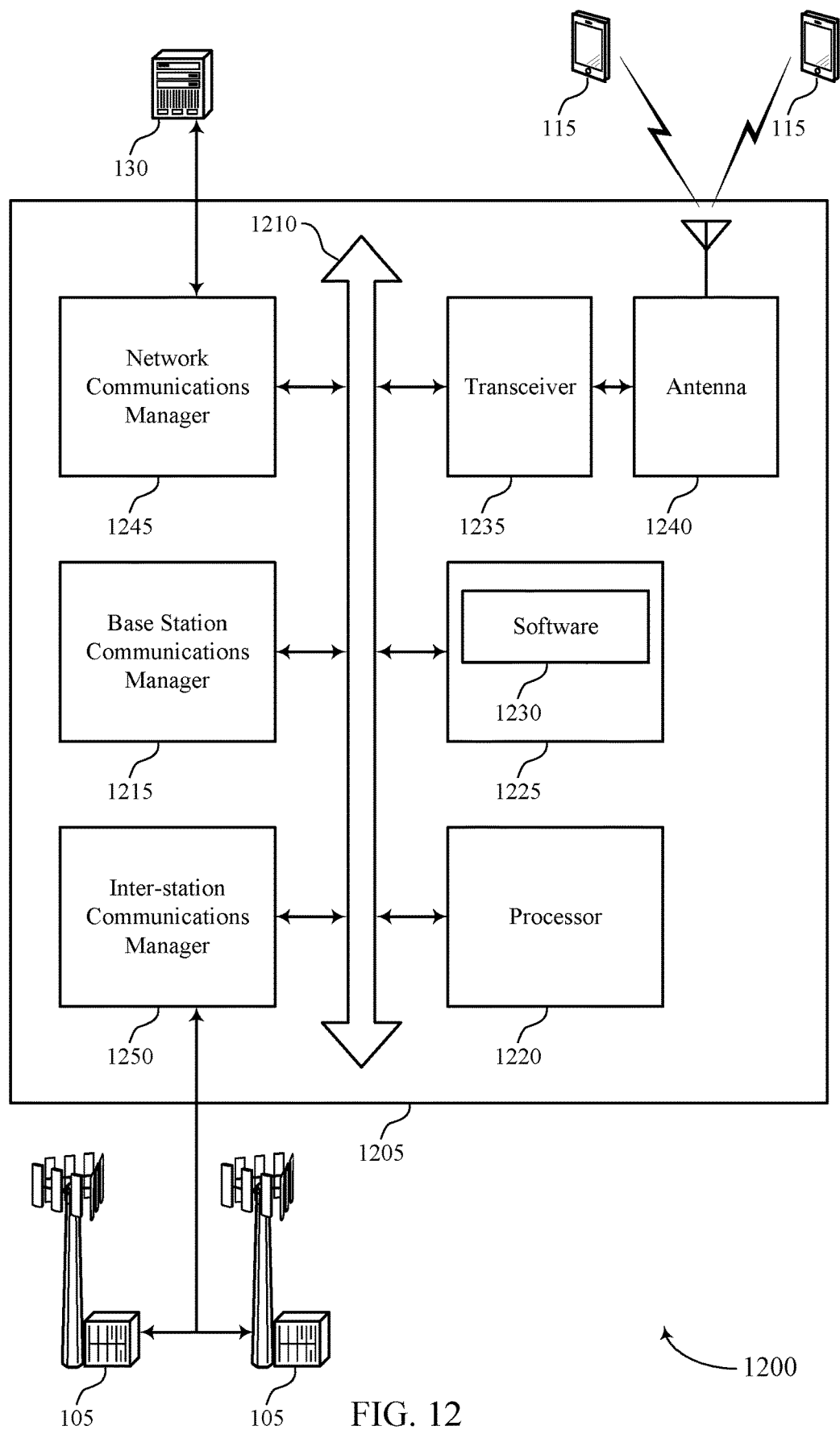
FIG. 12 illustrates a block diagram of a system including a base station that supports scheduling requests for wireless systems in accordance with aspects of the present disclosure.

FIG. 12 shows a diagram of a system 1200 including a device 1205 that supports scheduling requests for wireless systems in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting scheduling request for wireless systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support scheduling requests for wireless systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
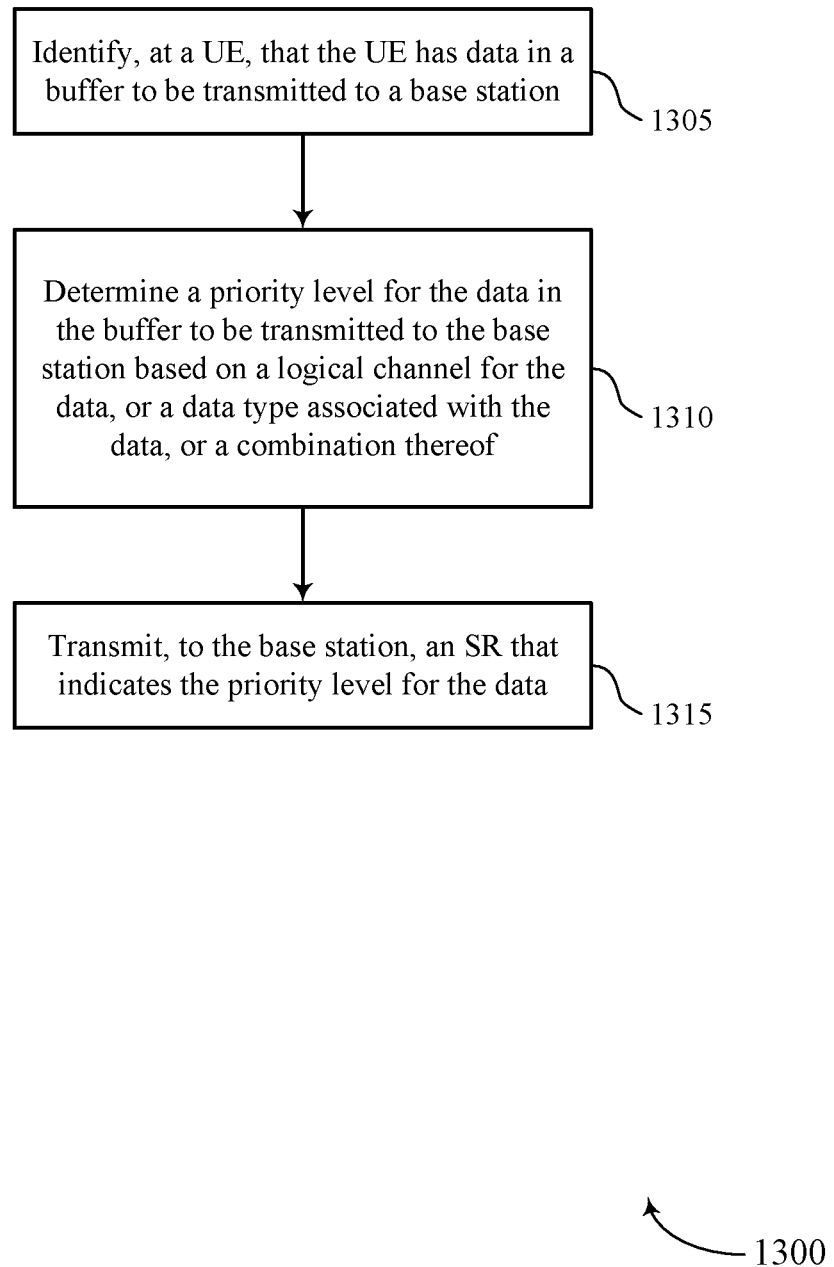
FIGS. 13 through 14 illustrate methods for scheduling requests for wireless systems in accordance with aspects of the present disclosure.

FIG. 13 shows a flowchart illustrating a method 1300 for scheduling requests for wireless systems in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify, at a UE, that the UE has data in a buffer to be transmitted to a base station. The operations of block 1305 may be performed according to the methods described herein. In certain examples, aspects of the operations of block 1305 may be performed by a data component as described with reference to FIGS. 5 through 8.

At block 1310 the UE 115 may determine a priority level for the data in the buffer to be transmitted to the base station based at least in part on a logical channel for the data, or a data type associated with the data, or a combination thereof. The operations of block 1310 may be performed according to the methods described herein. In certain examples, aspects of the operations of block 1310 may be performed by a priority component as described with reference to FIGS. 5 through 8.

At block 1315 the UE 115 may transmit, to the base station, an SR that indicates the priority level for the data. The operations of block 1315 may be performed according to the methods described herein. In certain examples, aspects of the operations of block 1315 may be performed by an SR component as described with reference to FIGS. 5 through 8.

Figure 14:
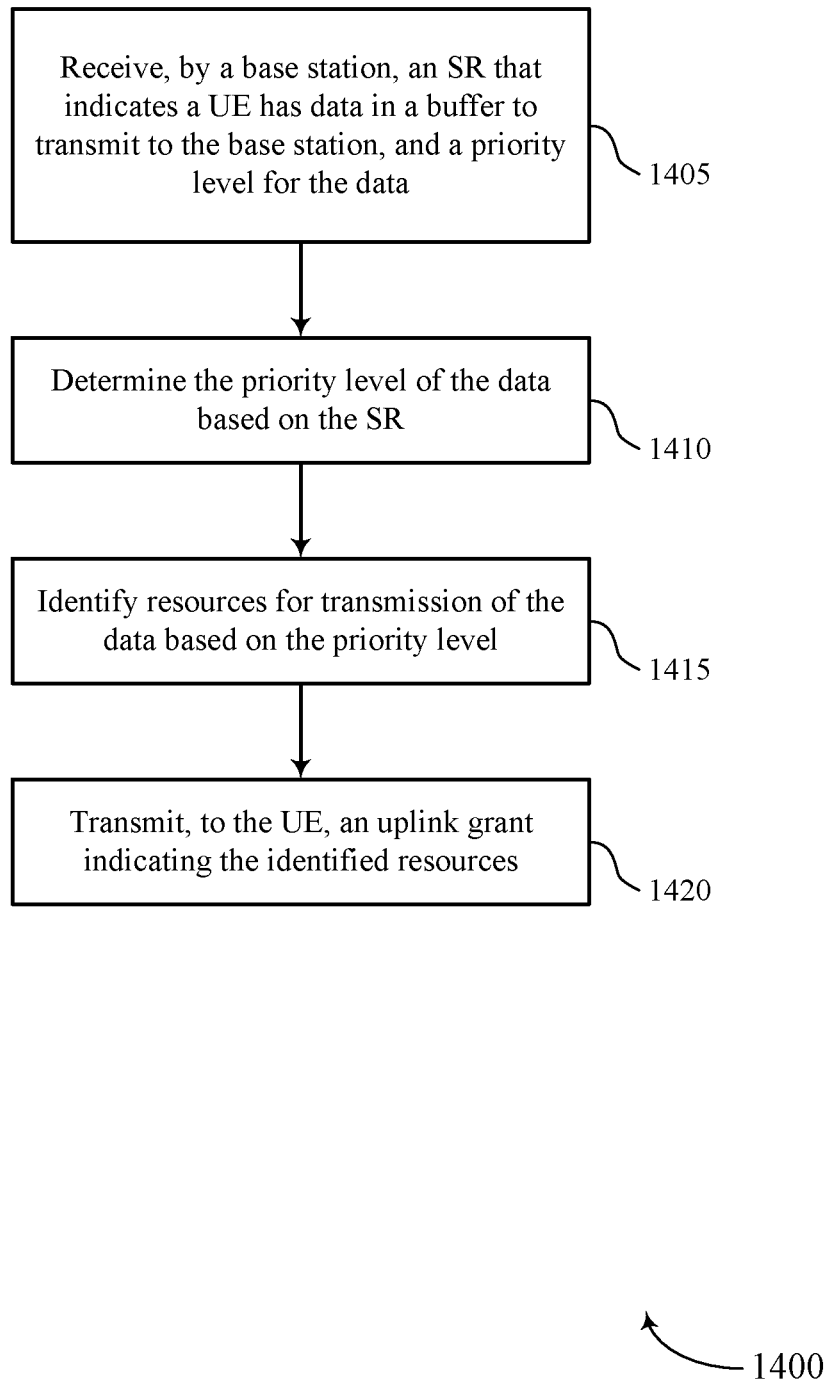

FIG. 14 shows a flowchart illustrating a method 1400 for scheduling requests for wireless systems in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may receive, by a base station, a SR that indicates a UE has data in a buffer to transmit to the base station, and a priority level for the data. The operations of block 1405 may be performed according to the methods described herein. In certain examples, aspects of the operations of block 1405 may be performed by an SR receiver as described with reference to FIGS. 9 through 12.

At block 1410 the base station 105 may determine the priority level of the data based at least in part on the SR. The operations of block 1410 may be performed according to the methods described herein. In certain examples, aspects of the operations of block 1410 may be performed by a priority level component as described with reference to FIGS. 9 through 12.

At block 1415 the base station 105 may identify resources for transmission of the data based at least in part on the priority level. The operations of block 1415 may be performed according to the methods described herein. In certain examples, aspects of the operations of block 1415 may be performed by a resource component as described with reference to FIGS. 9 through 12.

At block 1420 the base station 105 may transmit, to the UE, an uplink grant indicating the identified resources. The operations of block 1420 may be performed according to the methods described herein. In certain examples, aspects of the operations of block 1420 may be performed by a grant component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, at a user equipment (UE), that the UE has data in a buffer to be transmitted to a base station;
   determining a priority level for the data in the buffer to be transmitted to the base station based at least in part on a logical channel for the data, or a data type associated with the data, or a combination thereof, wherein the logical channel for the data or the determined priority level, or both, correspond to a numerology or a set of numerologies, wherein the numerology or the set of numerologies are associated with a subcarrier spacing in a frequency domain, or a symbol or a transmission time interval duration in a time domain;
   determining that the priority level exceeds a threshold;
   transmitting, to the base station, a scheduling request (SR) that indicates the priority level for the data, wherein transmitting the SR is based at least in part on determining that the priority level exceeds a threshold; and
   selecting, based at least in part on the determined priority level, a first set of radio resources of a plurality of sets of radio resources to be used to transmit the SR, wherein transmitting the SR comprises transmitting the SR using the identified first set of radio resources.

2. The method of claim 1, wherein:
   the SR includes an indication of the determined priority level using a bit field of the SR.

3. The method of claim 2, wherein:
   the bit field of the SR comprises a plurality of bits to indicate the determined priority level.

4. The method of claim 1, further comprising:
   receiving, from the base station, an uplink grant for transmission of the data in uplink message;
   identifying uplink resources for the uplink message based at least in part on the uplink grant; and
   transmitting, using the identified uplink resources, the uplink message comprising the data.

5. The method of claim 4, wherein:
   the uplink grant indicates resources that correspond to the logical channel for transmission of the data.

6. The method of claim 4, wherein:
   the SR is transmitted on a different set of resources than the identified uplink resources.

7. The method of claim 1, further comprising:
   selecting an SR configuration for transmission of the SR based at least in part on the determined priority level.

8. The method of claim 1, further comprising:
   transmitting, to the base station, a second SR based at least in part on an identification that the UE has additional data to be transmitted to the base station, wherein the SR corresponds to a first time period that is less than a second time period corresponding to the second SR.

9. The method of claim 1, further comprising:
   identifying, by the UE, that the UE has additional data to be transmitted to the base station; and
   determining a second priority level for the additional data based at least in part on a logical channel for the additional data, or a data type associated with the additional data, or a combination thereof, wherein transmitting the SR is based at least in part on the priority level being greater than the second priority level.

10. The method of claim 1, wherein:
    the SR includes an indication of a buffer status for the data to be transmitted to the base station.

11. The method of claim 1, further comprising:
    receiving, from the base station, a mapping that indicates a correspondence between values for the SR and priority levels for multiple logical channels.

12. The method of claim 1, further comprising:
    identifying a target numerology for the data to be transmitted to the base station, wherein the SR indicates the target numerology.

13. The method of claim 12, further comprising:
    selecting an SR configuration for transmission of the SR based at least in part on the target numerology.

14. The method of claim 1, wherein:
    the SR is transmitted over a dedicated set of resources.

15. A method for wireless communication, comprising:
    receiving, by a base station, a scheduling request (SR) that indicates a user equipment (UE) has data in a buffer to transmit to the base station, and a priority level for the data, wherein receiving the SR is based at least in part on the priority level being identified as exceeding a threshold, wherein the priority level is determined based at least in part on a numerology or a set of numerologies indicated by the SR, wherein the numerology or the set of numerologies are associated with a subcarrier spacing in a frequency domain, or a symbol or a transmission time interval duration in a time domain;

identifying a first set of radio resources of a plurality of sets of radio resources used to receive the SR;

determining the priority level of the data based at least in part on the SR and the identified first set of radio resources;

identifying resources for transmission of the data based at least in part on the priority level; and transmitting, to the UE, an uplink grant indicating the identified resources.

16. The method of claim 15, wherein:
the SR includes an indication of the determined priority level using a bit field of the SR.

17. The method of claim 16, wherein:
the bit field of the SR comprises a plurality of bits to indicate the determined priority level.

18. The method of claim 15, further comprising:
receiving, from the UE and over the identified resources for transmission of the data, an uplink message that comprises the data based at least in part on the uplink grant.

19. The method of claim 18, wherein:
the SR is received on a different set of radio resources than the uplink message.

20. The method of claim 15, wherein:
the uplink grant indicates resources that correspond to a logical channel to be used for transmission of the data.

21. The method of claim 15, wherein:
the SR is received according to the numerology; and
the identified resources are identified based at least in part on the numerology.

22. The method of claim 15, further comprising:
transmitting, to the UE, a mapping that indicates a correspondence between values for the SR and priority levels for multiple logical channels.

23. The method of claim 15, wherein:
the SR further includes an indication of a buffer status for the data to be transmitted to the base station.

24. An apparatus for wireless communication, comprising:
a processor;
memory in electronic communication with the processor; and
instructions stored in the memory and operable, when executed by the processor, to cause the apparatus to:
identify, at a user equipment (UE), that the UE has data in a buffer to be transmitted to a base station;
determine a priority level for the data in the buffer to be transmitted to the base station based at least in part on a logical channel for the data, or a data type associated with the data, or a combination thereof, wherein the logical channel for the data or the determined priority level, or both, correspond to a numerology or a set of numerologies, wherein the numerology or the set of numerologies are associated with a subcarrier spacing in a frequency domain, or a symbol or a transmission time interval duration in a time domain;
determine that the priority level exceeds a threshold;
transmit, to the base station, a scheduling request (SR) that indicates the priority level for the data, wherein transmitting the SR is based at least in part on determining that the priority level exceeds a threshold; and
selecting, based at least in part on the determined priority level, a first set of radio resources of a plurality of sets of radio resources to be used to transmit the SR, wherein transmitting the SR comprises transmitting the SR using the identified first set of radio resources.

25. An apparatus for wireless communication, comprising:
a processor;
memory in electronic communication with the processor; and
instructions stored in the memory and operable, when executed by the processor, to cause the apparatus to:
receive, by a base station, a scheduling request (SR) that indicates a user equipment (UE) has data in a buffer to transmit to the base station, and a priority level for the data, wherein receiving the SR is based at least in part on the priority level being identified as exceeding a threshold, wherein the priority level is determined based at least in part on a numerology or a set of numerologies indicated by the SR, wherein the numerology or the set of numerologies are associated with a subcarrier spacing in a frequency domain, or a symbol or a transmission time interval duration in a time domain;
identifying a first set of radio resources of a plurality of sets of radio resources used to receive the SR;
determine the priority level of the data based at least in part on the SR and the identified first set of radio resources;
identify resources for transmission of the data based at least in part on the priority level; and
transmit, to the UE, an uplink grant indicating the identified resources.

* * * * *